United States Patent Office 3,849,427
Patented Nov. 19, 1974

3,849,427
CERTAIN PYRIDINIUM ANILIDE HALIDE COMPOSITIONS
Victor A. Patison, Tonawanda, N.Y., assignor to Hooker Chemical Corporation, Niagara Falls, N.Y.
No Drawing. Filed Jan. 12, 1973, Ser. No. 323,180
Int. Cl. C07d 31/44
U.S. Cl. 260—295 Q         5 Claims

ABSTRACT OF THE DISCLOSURE

Resinous compositions of the formula

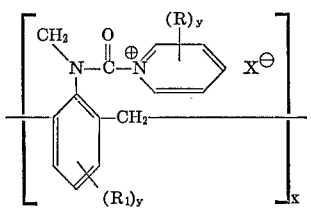

Such resins find utility in fabric treatment, as surfactants, in paper treatment and the like.

---

This invention relates to novel water-soluble resinous compositions. More particularly, this invention relates to novel resinous compositions and the production thereof from components consisting essentially of (a) formaldehyde (b) anilines (c) carbonic dihalide and (d) pyridines.

The resinous compositions produced in accordance with the present invention are water-soluble and find utility in the treatment, in either alkaline or acid conditions of textiles, paper, as surfactants or the like.

The novel resins of the present invention are those of the formula

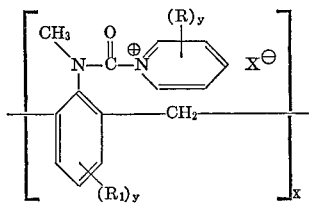

wherein R is hydrogen or an alkyl or aryl radical, generally of from 1 to 12 carbon atoms; $R_1$ is hydrogen, or an alkyl or aryl radical, generally having from 1 to 12 carbon atoms; $x$ is a number having a value of from about 1 to about 10, generally from about 1 to about 8, and preferably from about 1 to about 5; $y$ is a number having a value of 0 to 1; and X is halogen.

Exemplary of R are aromatics such as naphthyl and alkyls such as methyl and butyl; $R_1$ may be selected from alkyl or aromatic radicals, for example, lower alkyl such as methyl, propyl, isopropyl, butyl, isobutyl, functional derivatives of such radicals, or the like.

The molecular weight of the resins can vary from about 250 to as high as about 2500.

The preparation of the novel resinous compositions of the present invention is carried out in a process comprising three principal steps or stages. N-methyl aniline, is reacted with formaldehyde in a condensation reaction in step (a), the resulting resin is then reacted under suitable reaction conditions with a carbonic dihalide such as phosgene in step (b) and the resultant product is then reacted with a suitable pyridine in the step (c).

Suitable carbonic dihalides are phosgene, carbonic dibromide and the like. Preferably, phosgene is utilized in producing the novel resins of the present invention.

Suitable anilines for use in formulating the resins of the present invention include N-methyl aniline, 3,5-dimethyl N-methyl aniline, 4-phenyl N-methyl aniline, 3-hexyl N-methyl aniline, 4-hexyl N-methyl aniline, 3-butyl N-methyl aniline, 4-naphthyl N-methyl aniline, and the like, as well as mixtures of the anilines. The preferred aniline is N-methyl aniline.

Suitable pyridines useful in formulating the resins of the present invention include 3,5-dipropyl pyridine, 3-methyl pyridine, 4-naphthyl pyridine, 4-isobutyl pyridine, 4-phenyl pyridine, 3-hexyl pyridine, 4-isobutyl pyridine, 4-phenyl pyridine, 3-hexyl pyridine and the like, or mixtures thereof. The most preferred pyridine is the unsubstituted pyridine.

The formaldehyde used to prepare the resins may be obtained from such suitable sources as aqueous solutions of formaldehyde, trioxane, paraformaldehyde or the like. Preferably, the formaldehyde used is an aqueous solution, 37% by weight formaldehyde.

The reaction of the aniline compound and formaldehyde is preferably conducted by adding the formaldehyde on a continuous addition basis to the aniline reactant in a system acidified to a definite acid condition by a suitable mineral acid such as hydrochloric acid, the formaldehyde added in essentially stoichiometric amounts of aniline present. Following the addition of the formaldehyde, the reaction mixture is made alkaline by the addition thereto of a suitable agent, such as aqueous sodium hydroxide, a solid product resulting. The liquid phase is removed by decantation, and the reaction mixture heated to drive off residual water. The pH of the reaction medium, during the reaction is preferably maintained on the order of 1 or less.

The temperature during the step (a) reaction is generally maintained at from about 100 to about 160° C., preferably from about 130 to about 160° C. Generally, the time required to effect the condensation is on the order of from about 60 to about 90 minutes.

The reaction product obtained is then reacted with the selected carbonic dihalide, preferably phosgene, by adding a suitable solvent to the resin, heating to temperatures sufficient to remove any water present, cooking to less than 35° C., and adding phosgene continuously, in about stoichiometric amounts to react with the N-methyl amine groups present. Heat is applied to move the temperature gradually up to about 150° C., evolving hydrochloric acid. The temperature is generally moved through a range of 35 to 150° C. over a period of about 90 minutes. The solvent is removed by distillation, generally at about 120° C. under reduced pressures.

Suitable solvents include the halogenated aromatics, such as dichlorobenzene, chlorobenzene, and the like. Generally, the reaction is essentially completed within a period of from about 90 to 120 minutes.

The reaction product obtained from step (b) is then reacted with the selected pyridine by adding the pyridine in about stoichiometric amounts, stirring, and allowing the reaction mixture to stand for 2–8 hours, maintaining the temperature generally at ambient temperatures; however, the reaction may be conducted at elevated temperatures, on the order of about 90° C.

Example 1

N-methylaniline is condensed with formaldehyde at a pH of about 1 and at a temperature of about 130° C. The reaction product is added to dichlorobenzene and heated to remove water present. Phosgene is added to the reaction system, after cooling, and the temperature gradually increases to about 150° C. over a period of about 90 minutes. Following removal of the solvent, 18.1 grams of the product and 7.9 grams of pyridine are admixed and heated at about 90° C. for a short period of time. The reaction mixture is then allowed to stand overnight.

The product is a dark, friable, water soluble resin, obtained in quantitative yield (approximately 26 grams).

What is claimed is:

1. A process for producing compositions of matter of the formula:

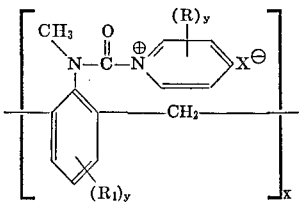

wherein R and $R_1$ are selected from the group consisting of hydrogen, and an alkyl radical having 1 to 6 carbon atoms or an aryl radical having 6 to 10 carbon atoms; X is halogen, $x$ is a number having a value of from about 1 to 10; and $y$ is a number having a value of 0 to 1; which comprises (a) reacting, in essentially stoichiometric amounts, formaldehyde and an N-methyl aniline of the formula

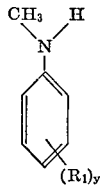

wherein $R_1$ and $y$ are as previously defined, (b) reacting the product of (a) with phosgene, in the absence of water, and (c) reacting the product of (b) with a pyridine of the formula

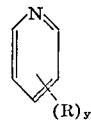

wherein R and $y$ are as previously defined.

2. A process as defined by Claim 1 wherein $R_1$ is hydrogen.

3. A process as defined by Claim 2 wherein X is chlorine.

4. A process as defined by Claim 3 wherein R is hydrogen.

5. A composition of matter prepared by the process as claimed in Claim 1.

References Cited
UNITED STATES PATENTS
2,518,266   8/1950   Baird et al. _____ 260—295 AM

OTHER REFERENCES

Karrer: Organic Chemistry, 4th English ed., p. 928, Elsevier Pub. Co. (N.Y.) 1950.

Chemical & Engineering News, Apr. 3, 1972, p. 18.

ALAN L. ROTMAN, Primary Examiner

U.S. Cl. X.R.

260—295 E, 295 K, 77.5 R, 77.5 Q; 8—116.2; 117—154, 155 R; 106—270

UNITED STATES PATENT OFFICE
CERTIFICATE OF CORRECTION

Patent No. 3,849,427  Dated  November 19, 1974

Inventor(s)  Victor A. Pattison

It is certified that error appears in the above-identified patent and that said Letters Patent are hereby corrected as shown below:

Column 1, line 5, "Patison" should be---Pattison---.

Signed and sealed this 4th day of March 1975.

(SEAL)
Attest:

RUTH C. MASON
Attesting Officer

C. MARSHALL DANN
Commissioner of Patents
and Trademarks